(12) United States Patent
Richards

(10) Patent No.: US 6,260,387 B1
(45) Date of Patent: Jul. 17, 2001

(54) METHOD FOR FABRICATING GLASS PREFORMS FOR MOLDING OPTICAL SURFACES IN GLASS ELEMENTS

(75) Inventor: David A. Richards, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/087,073

(22) Filed: May 29, 1998

(51) Int. Cl.[7] .......................... C03B 9/00; C03B 37/023; C03B 5/26; C03B 5/28
(52) U.S. Cl. ................... 65/385; 65/401; 65/404; 65/403; 65/66; 65/126; 65/475
(58) Field of Search .................. 65/401, 404, 37, 65/39, 66, 86, 126, 129, 475, 385

(56) References Cited

U.S. PATENT DOCUMENTS

| | | | |
|---|---|---|---|
| 3,833,347 | 9/1974 | Angle et al. | 65/32 |
| 4,060,401 | * 11/1977 | Maries et al. | 65/33 |
| 4,101,925 | * 7/1978 | Kelley et al. | 357/68 |
| 4,139,677 | 2/1979 | Blair et al. | 428/409 |
| 4,168,961 | 9/1979 | Blair | 65/66 |
| 5,425,795 | * 6/1995 | Koide et al. | 65/381 |
| 5,683,482 | * 11/1997 | Fredholm | 65/25.1 |
| 5,709,723 | 1/1998 | Gearing | 65/29.11 |
| 5,766,293 | 6/1998 | Gearing | 65/68 |

* cited by examiner

Primary Examiner—Stanley S. Silverman
Assistant Examiner—Jacqueline A. Ruller
(74) Attorney, Agent, or Firm—Mark G. Bocchetti

(57) ABSTRACT

A method for making preforms for use in a glass lens molding process and molding lenses is disclosed. A glass rod is formed preferably by dipping a bob into a homogeneous melt of a predetermined optical glass, maintaining the temperature of the homogeneous melt at least the melt temperature and producing a rod of glass from the homogeneous melt, allowing the rod of glass to cool and solidify, and then cutting the rod of glass into predetermined lengths. By withdrawing the bob at a predetermined pull rate the rod of glass can be produced with a predetermined diameter. Using a constant pull rate, the rod of glass will be cylindrical in shape and can be cut into a series of individual cylindrical preforms. The preforms can be inserted into a compression molding apparatus for the forming of a glass optical element therewith. The orientation of the preform is such that the cut planar surfaces of the preform are parallel to the direction of compression of the molding process. The preforms formed by the process exhibit both good surface quality and good internal quality. Orientation of the preform with the cut surfaces parallel to the direction of compression in the final compression molding operation ensures that the optical quality surface of the preform formed by surface tension will be the optical surface of the lens formed therewith and the cut or sawed surfaces of the preform will make up the periphery of the final lens.

10 Claims, 4 Drawing Sheets

METHOD FOR FABRICATING GLASS PREFORMS FOR MOLDING OPTICAL SURFACES IN GLASS ELEMENTS

FIELD OF THE INVENTION

The present invention relates generally to the molding of optical glass lenses and, more particularly, to a method for the manufacture of preform elements for use in the molding of optical glass lenses.

BACKGROUND OF THE INVENTION

Because the molding of glass optical elements is done by compression rather than injection (as is utilized in plastic molding) a precursor metered amount of glass, generally referred to as a preform, is required. There are two fundamental shapes of preforms required which generally parallel the two fundamental finished lens shapes. For negative lenses, plano-plano preforms usually will be sufficient. These can be fabricated in high volume relatively inexpensively by grinding and polishing. For positive lenses, a ball (sphere) or ball-like lump of glass is needed. The basic constant when molding positive or negative lenses is that the molds must touch the softened glass at the center first and then press out to the edges to avoid wrinkles and voids in the finished lens element.

Various methods and apparatus for the compression molding of glass optical elements are known in the prior art. With these methods and apparatus, optical element preforms sometimes referred to as gobs are compression molded at high temperatures to form glass lens elements. The basic process and apparatus for molding glass optical elements is taught in a series of patents assigned to Eastman Kodak Company. Such patents are U.S. Pat. No. 3,833,347 to Angle et al, U.S. Pat. No. 4,139,677 to Blair et al, and U.S. Pat. No. 4,168,961 to Blair. These patents disclose a variety of suitable materials for construction of mold inserts used to form the optical surfaces in the molded optical glass elements. Those suitable materials for the construction of the mold inserts included glasslike or vitreous carbon, silicon carbide, silicon nitride, and a mixture of silicon carbide and carbon. In the practice of the process described in such patents, a glass preform is inserted into a mold cavity with the molds being formed out of one of the above mentioned materials. The molds reside within a chamber in which is maintained a non-oxidizing atmosphere during the molding process. The preform is then heat softened by increasing the temperature of the mold to thereby bring the preform up to about 100° C. above the Glass Transition Temperature ($T_g$) for the particular type of glass from which the preform had been made. Pressure is then applied by the mold to force the preform to conform to the shape of the mold. The mold and preform are then allowed to cool below the transition temperature of the glass. The pressure from the mold is then relieved. The temperature is lowered further and the finished molded lens is removed.

One of the major factors which greatly effects the economics and quality of precision glass molding of optical elements is the fabrication of the precursor quantity of glass referred to herein as a preform. A preform may be distinguished from a blank such as those used in the conventional grinding and polishing operations for the manufacture of a lens. A blank has glass removed to become a finished part. A preform is merely reshaped in the molding process and it is not necessary to remove glass from the preform. This requires that the preform have a very good surface quality as well as internal quality. There are two principal methods used to fabricate preforms. The first is to grind and polish the preform to lens type quality in a shape that allows it to be further reshaped to a finished lens through the molding operation. Although this is the most straight forward method, it is also the most costly. The second technique is to produce the preform through some type of molten glass gobbing process. One such process is taught in U.S. application Ser. No. 08/725,382 entitled, "Method and Apparatus for Making Optical Preforms with Controlled Peripheral Edge Wall Geometry". A variant of this method is taught in U.S. Pat. No. 5,709,723 to Gearing.

The prior art fails to teach a method for producing continuous rods or sticks of glass having high surface and internal quality which can be cut to length to produce preforms of predetermined volumes with both good surface and internal quality. In such manner, the production of preforms becomes substantially continuous.

SUMMARY OF THE INVENTION

It is, therefore, an object of the present invention to provide a method for producing continuous rods of glass which can be cut in predetermined lengths for use as preforms for molding optical glass elements.

It is a further object of the present invention to provide a method for producing continuous sticks of glass comprising integrally formed, interconnected spherical beads which can be separated into individual preforms for use in molding optical glass elements.

Briefly stated, the foregoing and numerous other features, objects and advantages of the present invention will become readily apparent upon a reading of the detailed description, claims and the drawings set forth herein. These features, objects and advantages are accomplished through the steps of forming a homogeneous melt of a predetermined optical glass, maintaining the temperature of the glass at at least the melt temperature and producing a rod of glass from the homogeneous melt, allowing the rod of glass to cool and solidify, and then cutting the rod of glass into predetermined lengths. The rod may be formed by dipping a bob into a vessel such as a crucible containing the homogeneous melt and withdrawing the bob at a predetermined pull rate thereby producing the rod of glass with a predetermined diameter. Using a constant pull rate, the rod of glass will be cylindrical in shape and can be cut into a series of individual cylindrical preforms. Using a cyclical pull rate, the resulting rod of glass will be comprised of a stick of interconnected beads of glass which can be cut into individual spherical preforms. In either case, the preforms can be inserted into a compression molding apparatus for the forming of a glass optical element therewith. Whether the preform is cylindrical in shape or spherical in shape, orientation of the preform is such that the cut planar surfaces of the preform are parallel to the direction of compression of the compression molding process. The preforms formed by the process of the present invention exhibit both good surface quality and good internal quality. Orientation of the preform with the cut surfaces parallel to the direction of compression in the final compression molding operation ensures that the optical quality surface of the preform will be the optical surface of the lens formed therewith and the cut or sawed surfaces of the preform will make up the periphery of the final lens. Rather than drawing rods of glass using a bob as described above, alternatively, rods of glass may be extruded.

DETAILED DESCRIPTION OF THE INVENTION

Figure 1:
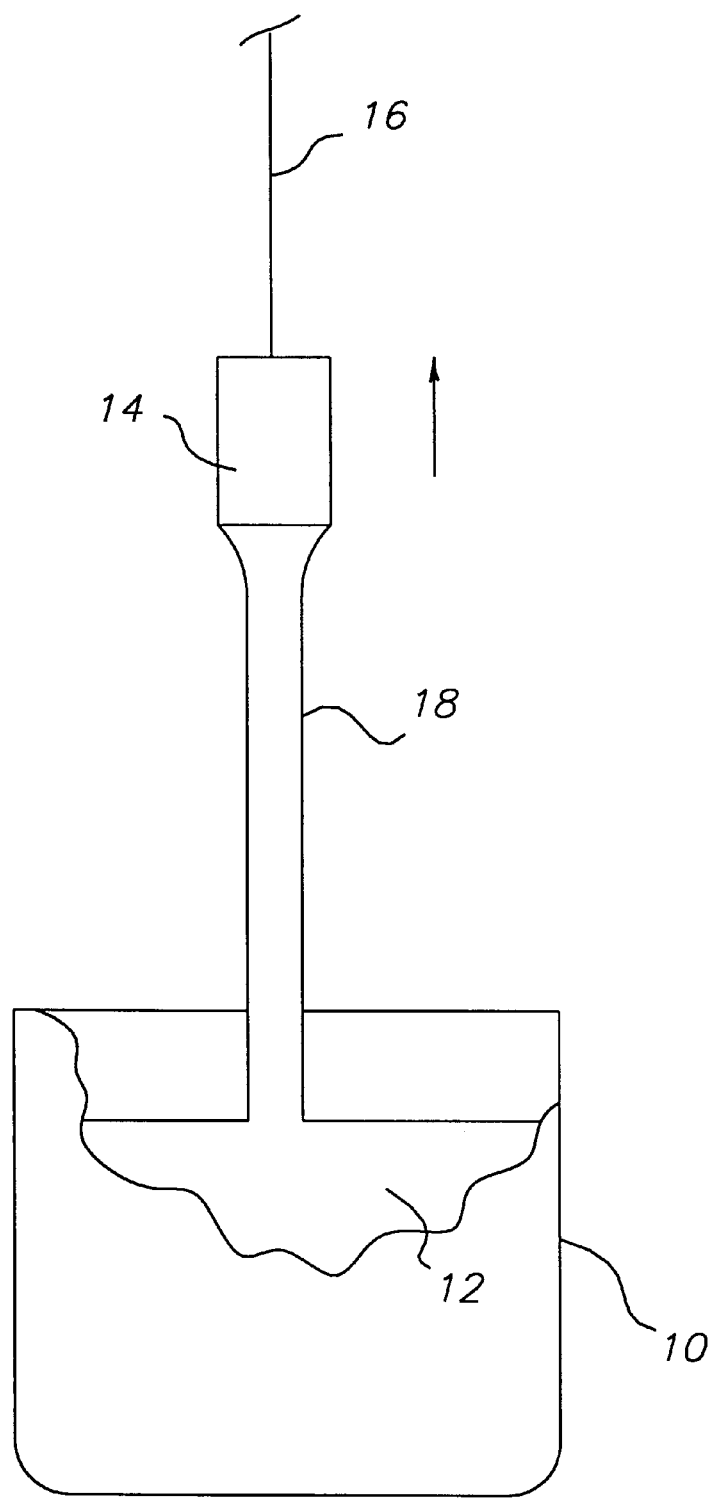
FIG. 1 is an elevational schematic of an apparatus for producing rods of glass.

Turning first to FIG. 1, there is shown a crucible 10 heated by means not shown. Contained within crucible 10 is a homogeneous melt 12 of an optical glass. Suspended above the crucible 10 is a bob 14 which is preferably made of a noble metal such as platinum. Bob 14 is preferably cylindrical in shape. Bob 14 is suspended from wire 16. In the practice of the method of the present invention, the bob 14 suspended from wire 16 is lowered into the homogeneous melt 12. Wire 16 is then slowly pulled upward to withdraw bob 14 from the homogeneous melt 12. As the bob 14 is slowly pulled upward a rod of glass 18 is formed. The size of the bob 14, the viscosity of the glass, and the pull rate will determine the diameter of the rod 18. A servomechanism (not shown) may be used to control the pull rate on wire 16 and bob 14 in order to generate a more uniform rod 18. As a portion of the glass rod 18 rises a distance above crucible 10, glass rod 18 solidifies on cooling and can be broken off in lengths of convenient size for handling. Glass rods 18 formed in this manner have excellent surfaces produced by surface tension. In addition, internal quality can also be excellent. Using the method of the present invention, a greater variety of glasses can be drawn into rod and at larger diameters than can be produced in gob forming operations by dripping such as is taught in U.S. Pat. No. 5,709,723.

Figure 2:
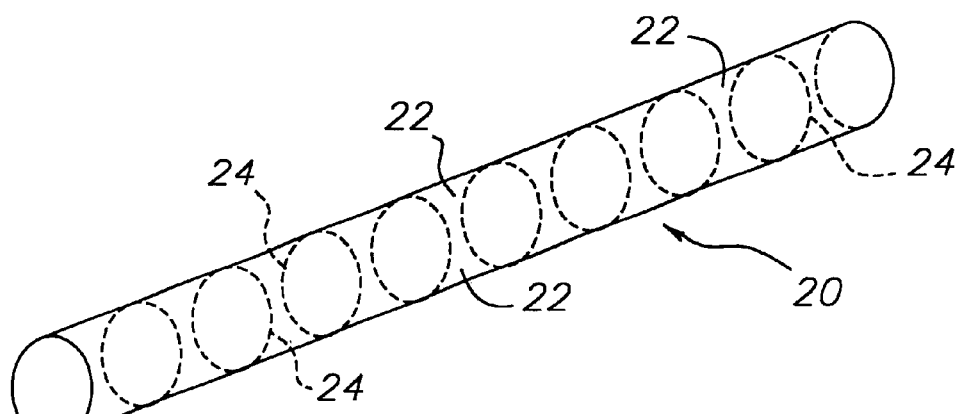
FIG. 2 is a perspective view of a rod of glass produced by the apparatus of FIG. 1.
Figure 3:
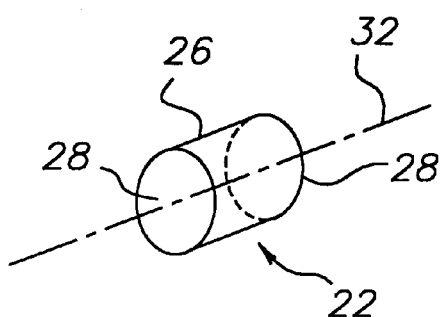
FIG. 3 is a perspective view of a cylindrical preform cut from the rod depicted in FIG. 2.

Turning next to FIG. 2, there is depicted an exemplary section 20 of a rod of glass produced in accordance with the method described in connection to FIG. 1 above. The next step of the method of the present invention is to take the section 20 of the rod of glass 18 and cut it into a series of cylinders 22 as is indicated by dotted lines 24. Cutting can be accomplished in a variety of means such as, for example, a mechanical gang saw. Care should be taken when cutting section 20 into cylinders 22 not to mar the cylindrical surfaces of cylinders 22. The length of each cylinder 22 would be predetermined and dependent on the volume of the intended lens to be molded therewith. Thus, with the intended volume known and the diameter of the section 20 known, the necessary length of each cylinder 22 can be calculated and cut accordingly. The result are a series of cylinders 22 having a cylindrical surface 26 of excellent surface quality and two circular cut surfaces 28 of poor surface quality (See FIG. 3).

The final molding operation can be performed by laying cylinders 22 on their cylindrical surfaces 26 in the compression molding apparatus (not shown) between two mold tools 30 (FIG. 4) such that the cylindrical axis 32 of cylinder 22 (FIG. 3) is horizontal and is perpendicular to the direction of compression as indicated by arrow 34. The rough circular surfaces 28 of the cylinder 22 will now be at or proximate to the peripheral edge of the lens molded therefrom. Thus, that portion of the molded lens which does not have good surface quality as a result of the surfaces 28 can be removed by subsequent edging (centering). Alternatively, the peripheral portion of the lens can be ignored depending on the particular mounting scheme employed such as, for example, plastic injection mounting. The plastic injection mount can be used to cover the peripheral portion of the lens.

It may be preferable to make a minor modification to the mold tooling of the compression molding operation in order to accommodate these little cylinders 22. The mold rings which surround and support mold tools 30 may be provided with detents in which cylinders 22 would be positioned. These detents would, of course, require that cylinders 22 be long enough to span the mold tools 30. Such detents would ensure proper positioning of cylinders 22 within the molding apparatus.

The method of the present invention has been successfully demonstrated for the most difficult of lens geometries to mold, that being a double positive lens. Hoya TaC-4™ glass was drawn from a vessel of molten glass and broken off into sticks or rods 20 of approximately 1 meter lengths. The diameter of each rod was approximately 5 millimeters. Some of these rods 20 were sawed into approximately 7 millimeter long cylinders 22. The cylinders were placed directly on spherical surfaced tools of larger diameter and pressed into double positive lenses which evidenced good interferometric test. The resulting molded lenses had a pin cushion like periphery. Menisci lenses should even be easier to mold because the upper mold tool is convex in shape. Double negative lenses would require an additional shaped holder ledge between the two molding tools. Little semi-cylindrical detents would satisfy this requirement.

Figure 6:
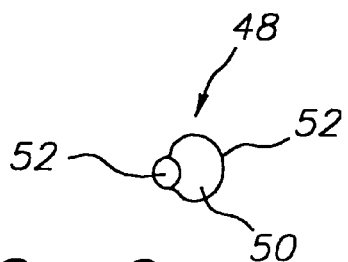
FIG. 6 is an individual spheroidal preform or bead cut from the stick of beads depicted in FIG. 5.
Figure 5:
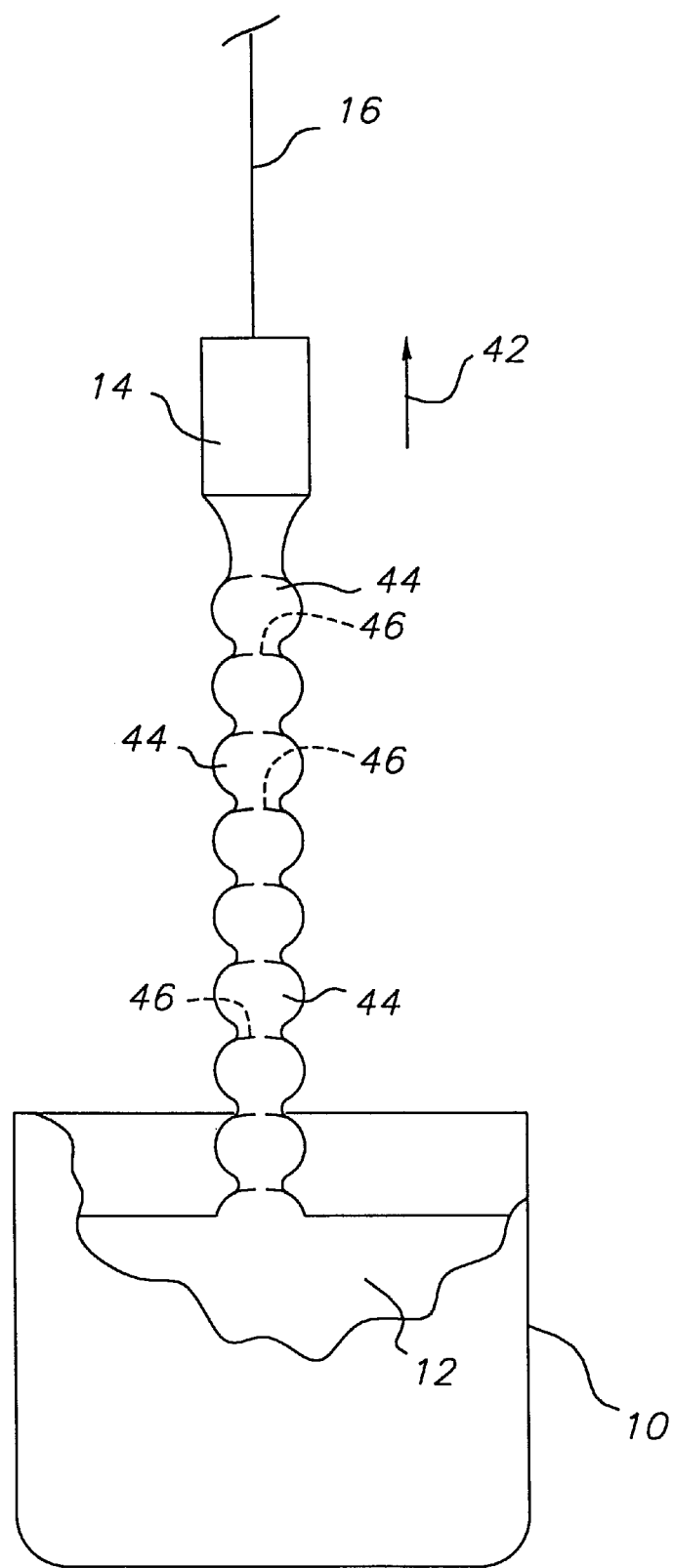
FIG. 5 is an elevational schematic of the same apparatus depicted in FIG. 1 operated with a cyclical pull rate in order to produce rods of glass formed of integrally formed, interconnected beads.

Looking next at FIG. 5, there is again shown a crucible 10 containing a homogeneous melt 12 and having a bob 14 suspended there above from a wire 16 identical to that depicted in FIG. 1. Once again, bob 14 is lowered into the homogeneous melt 12 and slowly pulled up to form a rod of glass 40. In this instance, however, bob 14 is pulled in the direction of arrow 42, but not at a constant pull rate. Rather, the rate of pull is cyclical. As a result, rod 40 does not have a constant diameter. Instead, rod 40 is comprised of a series of integrally formed interconnected beads 44. After the glass rises a certain amount above the crucible 10, the glass solidifies on cooling and can again be broken off in lengths of convenient size for handling. Sections of glass rods 40 can then be cut along dotted lines 46 to yield a plurality of spheroidal preforms 48, an exemplary one of which is depicted in FIG. 6. Preform 48 includes a generally spherical surface 50 of good optical quality (as a result of surface tension) and two rough cut surfaces 52. Spheroidal preform 48 can be inserted into a glass molding apparatus and would be particularly advantageous in the molding of double positive lenses therefrom. Again, cut surfaces 52 would be oriented to be parallel to the direction of compression 34 of the compression molding apparatus.

Figure 4:
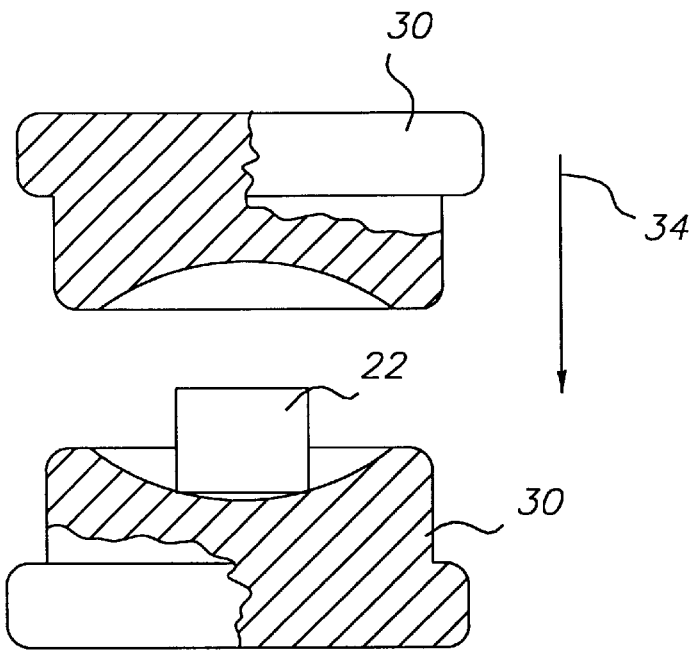
FIG. 4 is a partial section of an elevational schematic of an apparatus for molding glass lenses from a cylindrical preform.
Figure 7:
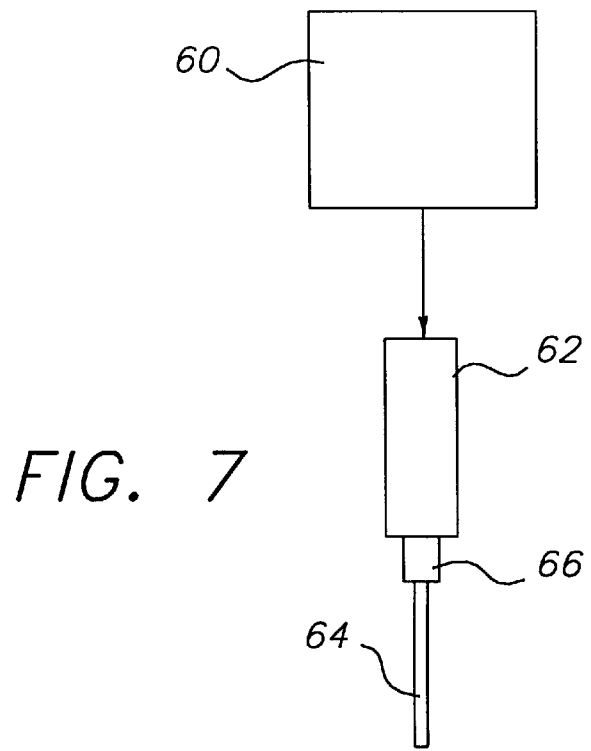
FIG. 7 is a schematic depiction of an alternative method for producing rods of glass from that depicted in FIG. 1.

Turning next to FIG. 7, there is schematically depicted an alternative method of the present invention from that depicted in FIGS. 1 and 4. The heated crucible 60 containing a homogeneous melt of glass supplies such melt of glass to an extruder apparatus 62 which extrudes a rod of glass 64 therefrom through an extrusion die 66. After the glass cools sufficiently and solidifies, sections can be broken off and cut into cylindrical preforms just as described above in relation to FIG. 1. It is possible that the alternative method of producing glass rods 64 can be practiced without extrusion device 62 and extrusion die 66. Instead, a spout could be placed at the bottom of crucible 60 and glass rods could be literally poured therefrom.

From the foregoing, it will be seen that this invention is one well adapted to attain all of the ends and objects hereinabove set forth together with other advantages which are apparent and which are inherent to the method.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for fabricating preforms for use in a glass lens molding process, said method comprising the steps of:
    (a) forming a homogeneous melt of a predetermined optical glass;
    (b) dipping a bob into the homogeneous melt;
    (c) withdrawing the bob from the melt to form a rod of glass extending therefrom, the glass rod being formed with an optical quality surface;
    (d) allowing the rod of glass to cool and solidify; and
    (e) cutting the rod of glass in predetermined lengths.

2. A method as recited in claim 1 wherein:
    said withdrawing step is performed at a predetermined pull rate to produce the rod of glass with a predetermined diameter.

3. A method as recited in claim 2 wherein:
    said predetermined pull rate is a cyclical pull rate resulting in a rod of glass comprising a stick of interconnected beads.

4. A method for fabricating glass lenses, said method comprising the steps of:
    (a) forming a homogeneous melt of a predetermined optical glass;
    (b) dipping a bob into the homogeneous melt;
    (c) withdrawing the bob from the melt to form a rod of glass extending therefrom, the glass rod being formed with an optical quality cylindrical surface;
    (d) allowing the rod of glass to cool and solidify;
    (e) cutting the rod of glass in predetermined lengths to form a plurality of cylindrical glass preforms, each with an optical quality cylindrical surface; and
    (f) inserting one of said cylindrical glass preforms in a compression molding apparatus with a cylindrical axis of said one of said cylindrical glass preforms perpendicularly oriented with respect to a direction of compression.

5. A method for fabricating preforms for use in a glass lens molding process, said method comprising the steps of:
    (a) forming a homogeneous melt of a predetermined optical glass having a melt temperature;
    (b) maintaining a temperature of the homogeneous melt at least the melt temperature and producing a rod of glass from the homogeneous melt, the rod of glass having an optical quality cylindrical surface formed by surface tension;
    (c) allowing the rod of glass to cool and solidify; and
    (d) cutting the rod of glass in predetermined lengths to yield a plurality of cylindrical preforms, each with an optical quality cylindrical surface which becomes the surface of a glass lens molded therefrom.

6. A method as recited in claim 5 wherein:
    said producing step is performed by withdrawing a bob from the homogeneous melt at a predetermined pull rate to produce the rod of glass with a predetermined diameter.

7. A method as recited in claim 5 wherein:
    said predetermined pull rate is a cyclical pull rate resulting in a rod of glass comprising a stick of interconnected beads.

8. A method as recited in claim 5 wherein said step of producing a rod of glass comprises the steps of:
    (a) dipping a bob into the homogeneous melt;
    (b) withdrawing the bob from the melt to form the rod of glass extending from the bob.

9. A method as recited in claim 5 wherein said step of producing a rod of glass comprises the step of:
    extruding the rod of glass from a vessel in which the homogeneous melt resides.

10. A method as recited in claim 8 wherein:
    said dipping step is performed with the bob being fabricated from a noble metal.

* * * * *